(12) United States Patent
Johnson et al.

(10) Patent No.: US 7,264,649 B1
(45) Date of Patent: Sep. 4, 2007

(54) SYSTEM FOR ALLERGEN REDUCTION THROUGH INDOOR HUMIDITY CONTROL

(75) Inventors: Eric Arthur Johnson, Greene, NY (US); Joseph Duane Kulesza, Binghamton, NY (US)

(73) Assignee: Advanced Design Consulting USA, Inc., Lansing, NY (US)

( * ) Notice: Subject to any disclaimer, the term of this patent is extended or adjusted under 35 U.S.C. 154(b) by 450 days.

(21) Appl. No.: 10/898,042

(22) Filed: Jul. 23, 2004

(51) Int. Cl.
*B01D 53/04* (2006.01)
*B01D 53/26* (2006.01)

(52) U.S. Cl. .............. 95/10; 95/121; 96/111; 236/44 R; 236/44 C

(58) Field of Classification Search .............. 95/10, 95/90, 117, 121, 148; 96/108, 111, 422; 62/176.1; 236/44 R, 44 A, 44 C; 34/467, 34/472, 473, 474, 80; 252/194
See application file for complete search history.

(56) References Cited

U.S. PATENT DOCUMENTS

| | | | | |
|---|---|---|---|---|
| 4,683,258 A | * | 7/1987 | Itoh et al. | 524/434 |
| 4,711,294 A | * | 12/1987 | Jacobs et al. | 165/230 |
| 5,100,933 A | * | 3/1992 | Tanaka et al. | 523/300 |
| 5,230,466 A | * | 7/1993 | Moriya et al. | 236/44 A |
| 5,565,139 A | * | 10/1996 | Walker et al. | 252/194 |
| 5,572,799 A | * | 11/1996 | Masuyuki et al. | 34/80 |
| 6,481,222 B1 | * | 11/2002 | Denniston | 62/94 |
| 6,863,711 B2 | * | 3/2005 | Tongue et al. | 95/10 |
| 6,966,364 B1 | * | 11/2005 | Babikian et al. | 165/228 |

* cited by examiner

*Primary Examiner*—Frank M. Lawrence
(74) *Attorney, Agent, or Firm*—Leo B Kriksunov; Anne M. Schneiderman

(57) ABSTRACT

The invention provides a humidity control system (HCS) to control indoor humidity within a specified range so as to reduce indoor house-dust mite allergen levels. The invention also provides a hydrogel absorber/desorber for reversibly absorbing water vapor from air releasing water vapor to air. The invention employs a reversible hydrogel desiccant as the active element for absorption and desorption of water, thus rendering the HCS more effective and energy-efficient than traditional humidification/dehumidification systems. The HCS of the invention treats indoor air by drawing fresh air in from outside and adjusting the humidity of the air-stream. In certain embodiments, fresh air is drawn in from the outside and mixed with recirculated air. The HCS uses a controller to introduce fresh air into the interior space and to control air circulation within it. Relative humidity is monitored remotely throughout the interior space using wired or wireless sensors.

20 Claims, 12 Drawing Sheets

SYSTEM FOR ALLERGEN REDUCTION THROUGH INDOOR HUMIDITY CONTROL

CROSS-REFERENCE TO RELATED APPLICATIONS

Not applicable

STATEMENT REGARDING FEDERALLY SPONSERED RESEARCH OR DEVELOPMENT

Not applicable

REFERENCE TO APPENDIX

Not applicable

TECHNICAL FIELD

The present invention relates to humidity control systems for controlling indoor humidity and reducing indoor house-dust mite allergen levels.

BACKGROUND OF THE INVENTION

The need to control the indoor environment in order to alleviate the suffering of people affected by allergies has been recognized since the early twentieth century (C. C. Keirns, "Better than nature: the changing treatment of asthma and hay fever in the United States, 1910-1945", Stud. Hist. Phil. Biol. & Biomed. Sci., 34 (2003) 511-531). In 1931, Dr. Warren Vaughan stated that "Allergic treatment has, broadly, two objectives: the rearrangement of the environment to prevent access of the allergen to the patient and rearrangement of the patient so that he will not be as sensitive to the allergens remaining in his environment. Sometimes the allergen can be removed from the neighborhood of the patient, at other times the patient must be removed from the neighborhood of the allergen" (W. T. Vaughan, Allergy and applied immunology: A handbook for physician and patient, on asthma, hay fever, urticaria, eczema, migraine and kindred manifestations of allergy, C. V. Mosby Company (1931) St. Louis). In advocating the removal of the allergen from the patient's environment, Dr. Vaughan's approach anticipated much of the work of researchers and clinicians over the next seventy years. While many allergists pursued the path of desensitization, others sought to isolate the sufferer from external sources of allergens, such as pollens, and to eliminate the allergens that originate within the home environment. Elimination of allergens originating within the home environment was aided by changes in architectural style that eliminated allergen reservoirs by removing carpets, wallpapers and fabric hangings, and cloth-upholstered furnishings from the home, and in particular from the bedroom.

One of the most pervasive of allergens in housing is Der p1, the major antigen found in the fecal pellets of *Dermatophagoides pteronyssinus*, the house-dust mite (HDM). Other common household allergens are Bla g1, which originates from the German cockroach, and Fel d1 and Can f1, from cats and dogs respectively. High-efficiency particulate arrest (HEPA) air cleaners are currently marketed as a means to remove particles associated with these allergens, but have not been found to be particularly effective in relieving symptoms. Tests show that such filters can remove virtually all particles larger than 0.3 µm from the air stream, however, heavy particles (those with diameters of about 10 µm and larger) remain airborne for very short periods, settle very quickly, and are unlikely to be trapped by the filter. Electrostatic filtration is also effective in removing particles from the air stream but is no more effective than HEPA filtration in clinical tests (L. F. Gaunt, K. L. Jerrim and J. F. Hughes, "Electrostatic control of domestic dust and allergen particles for improved air quality", Powder Technology, 135-136, (2003) 354-360).

Standards have been established for filtration in large commercial heating, ventilation and air-conditioning (HVAC) systems. Particles over one-micron in size are easily removed by applying air filtration according to American Society of Heating, Refrigerating and Air-Conditioning Engineers (ASHRAE) recommendations. MERV (Minimum Efficiency Reporting Value) ratings indicates minimum efficiency values for air filters. A new air filter is at its lowest efficiency value because dust and particles have not yet built up on the filter to help trap more dust and particles. The MERV rating not only indicates the minimum efficiency value but also indicates the size of the particles a filter can trap. The scale that the MERV system uses ranges from a MERV 1 to a MERV 16 (95%+AHRAE filter). Low-cost MERV pleated panel filters, for example, have an efficiency against mold spores of over 80%. Since molds reproduce from these spores, elimination of mold spores can quickly reduce the severity of a mold spore problem provided that the number of air-changes is sufficiently high. (Air-changes are defined as the number of times a volume of air equivalent to the room's volume is delivered in an hour).

HEPA vacuum cleaners have been sold as a means to reduce dust and related allergens, but also fail to deliver relief. In a study conducted at the North West Lung Center in the United Kingdom, five new HEPA vacuum cleaners "failed to leak any allergen [when tested in an] experimental chamber." However, even though the HEPA vacuum cleaners were found to not leak allergen, the level of cat allergen, as measured by nasal sampling, increased by from three- to five-fold during vacuuming, whether a new HEPA vacuum cleaner or an old, standard vacuum cleaner was used (R. B. Gore et al., "High-efficiency particulate arrest-filter vacuum cleaners increase personal cat allergen exposure in homes with cats, J. of Allergy and Clinical Immunology, 111, 4 (2003) 784-787).

Repeated cleaning, air filtration, wet dusting and vacuuming with an electrostatic spray can eventually reduce the levels of allergens, provided that the allergen source has been removed from the room, but this is particularly difficult in the case of dust mites within bedding. Both chemical treatments, such as benzyl benzoate to control the number of HDM, and denaturing HDM allergens (using, for example, tannic acid) have been used with some success. Microporous mattress and pillow barriers have been shown to be effective in double-blind clinical tests (B. B. Tan, D. Weald, I. Strickland and P. Friedmann, "Double-blind controlled trial of effect of housedust-mite allergen avoidance on atopic dermatitis", The Lancet, 347, 8993 (1996) 15-19). Despite the proven effectiveness of these treatments, they require diligence on the part of the user. To achieve a sustained and widespread reduction in the concentration of dust mite allergens, a treat-it and leave-it approach must be developed in order to provide relief for the general population of allergy sufferers.

This type of pervasive reduction is the goal of "Healthy People 2010, objective 8-16". "Healthy People 2010" proposes a 20% reduction in the number of homes in the United States that exceed clinically relevant thresholds for HDM allergen (S. J. Arbes et al., "House dust mite allergen in US beds: Results from the first national survey of lead and allergens in housing", Journal of Allergy and Clinical Immunology, 111, 2 (2003) 408-414).

Humidity control within the home offers the opportunity to achieve this objective. Several studies have shown that a relative humidity (RH) of above about 60% greatly accelerates the reproduction of HDM with accompanying increases in HDM allergens. In a study by Arlian et al., three test groups were monitored during two summers of relatively high humidity (L. G. Arlian et al., "Reducing relative humidity is a practical way to control dust mites and their allergens in homes in temperate climates", J. Allergy & Clinical Immunology, 107, 1 (2001) 99-104). The first group, which used air-conditioning and dehumidification to maintain an RH of below 51%, was found to have a concentration of 4±1 μg of Der p1 per gram of dust. The group that used neither means to control RH was found to have a concentration of Der p1 that was 40 to 70% greater than the first group.

A study by Andersen showed that "almost no house dust mites are able to survive" at an RH of less than 45% and temperatures of 20-22° C. (I. Andersen and J. Korsgaard, "Asthma and the indoor environment: Assessment of the health implications of high indoor air humidity", Environment International, 12, 1 (1986) 121-127). These conditions were also found to inhibit the growth of mold and their production of spores. This latter finding is of particular importance in new construction. The presence of mold in buildings is becoming more common, owing to more airtight construction practices that improve insulation and energy efficiency, but precipitate moisture in walls and ceilings.

Too low a value of RH can increase drying of mucous membranes and increase the incidence of respiratory infections. The benefits of humidity control have been well illustrated by Sterling (T. Sterling, "Effect of Room Relative Humidity on Selected Human Health Parameters", ASHRAE Transactions, 90, 2 (1984)) and have been corroborated by several studies. In a study of twelve Canadian schools, a linear correlation between indoor relative humidity and absenteeism was found. A 20% reduction in absenteeism was observed when the indoor relative humidity was increased from 22 to 35%. The study concluded that the reduction in absenteeism was owing to the reduction in survival rate of airborne micro-organisms at the elevated relative humidity (G. H. Green, "The effect of indoor relative humidity on absenteeism and colds in schools. ASHRAE J. (1975) 57-62). This conclusion has been borne out by other studies on bacteria (E. Robine, D. Dérangére and D. Robin, "Survival of a Pseudomonas fluorescens and *Enterococcus faecalis* aerosol on inert surfaces", International J. of Food Microbiology, 55, 1-3 (2000) 229-234) and on viruses (A. I. Donaldson and N. P. Ferris, "The survival of some air-borne animal viruses in relation to relative humidity", Veterinary Microbiology, 1, 4 (1976) 413-420). Given these results, a range of 40 to 60% RH would be an ideal target RH for a room in a dwelling.

2.1 Current Methods of Absorption and Desorption of Moisture From Rooms

Typically, moisture is removed from an air stream by condensation on refrigeration coil. Dehumidifiers that use such technology are widely used but are noisy, costly and consume substantial amounts of electricity. When operated at low temperatures, the coils can become coated with frost, making them ineffective. Most domestic units have only a rudimentary control system and make no attempt to control the introduction of conditioned fresh air to the room. They also lack any means to introduce moisture into the environment during dry periods.

More sophisticated systems are used in large applications in which humidity control is important, such as clean-rooms in manufacturing facilities, portions of hospitals, and some office buildings. These systems can control the humidity, temperature and the amount of fresh air delivered to the building, but cannot independently control these parameters within any particular room. At best, each room may have dampers to control the amount of air entering in response to the temperature set by a thermostat. Variables such as heat sources within the room, open widows or doors, sunlight, external conditions and the number of occupants will cause humidity and temperature to vary independently. In addition to the difficulty in controlling these factors, the cost to install such a system in a home would clearly put it beyond the means of many people.

An alternative to removing moisture from an air stream by condensation is to use a desiccant material. Desiccant materials naturally absorb moisture from the surrounding atmosphere. The most familiar of these materials is silica gel, which is packaged along with many products that are purchased by the consumer. Other materials used as desiccants include lithium chloride salt, titanium silicate and activated alumina. Since a desiccant can absorb only a specific amount of moisture (e.g., silica gel can absorb about 40% by weight), the amount must be carefully controlled to accommodate the amount of moisture present within the package, which must itself be impermeable.

Desiccants can be regenerated by heating, which drives off the absorbed water. This is the mechanism used in desiccant coolers and dehumidifiers. Moist outside air is passed over the desiccant, which absorbs water and releases heat into the air stream. This dried, heated air then passes through an outside air-to-air heat exchanger that returns it to nearly its initial temperature. The air temperature can be further reduced by evaporative cooling or by conventional refrigeration units. Evaporative cooling is preferable to conventional refrigeration, since it has a low initial cost, uses little energy, and contains no ozone-depleting HCFCs.

Current dehumidification systems that are for use in entire houses or buildings and the use desiccants employ a wheel containing the desiccant. As the wheel turns, the incoming air stream is dried in one portion, transferring its moisture to the desiccant. In another portion of the wheel, the desiccant is dried by waste heat, sunlight or an externally powered heater. It has been estimated that the energy savings obtained from using desiccant cooling instead of conventional dehumidifying techniques could reach 120 billion kilowatt-hours per year in the United States and prevent the annual emission of more than 22 million metric tons of carbon dioxide (U.S. Department of Energy, National Renewable Energy Laboratory, "The Advanced Desiccant Cooling and Dehumidification Program: Desiccant Cooling Quick Facts," www.nrel.gov/desiccantcool/quick_facts.html).

The use of silica gel as a desiccant in dehumidifying systems, however, has several drawbacks. Before silica gel can be reused, it must be regenerated by heating for several hours at temperatures of more than 100° C. in order to drive off absorbed water. This process requires considerable expenditure of energy and adds heat to the room which, during the summer months, must be removed using air-conditioning. In addition, silica gel exhibits porosity only on a microscopic scale, making it difficult to force air through the material.

Another drawback of current dehumidifying systems is one that is also commonly encountered with current heating control systems: poor placement of the sensor. If a thermostat for a heating control system is located in a position where it is exposed to drafts, sunlight or local heat sources, room temperature will not be well controlled. The same problems arises with humidity sensors. Existing room dehumidifiers and air-conditioners rely on a sensor located directly on the appliance, near the air-stream, where conditions may not represent those of the entire room.

There is therefore a need in the art for a humidity control system to control indoor humidity with a specified range so as to reduce house-dust mite (HDM) and other types of allergen levels in the interior spaces of buildings while maintaining sufficient moisture to prevent drying of mucous membranes. There is also a need for more suitable, energy-efficient desiccants for use in such systems. There is also a need for a humidity control system which employs improved sensor placement, so that indoor humidity may be more accurately controlled to fall within the specified range.

Citation or identification of any reference in Section 2, or in any other section of this application, shall not be considered an admission that such reference is available as prior art to the present invention.

SUMMARY OF THE INVENTION

The present invention provides a humidity control system (HCS) to control indoor humidity within a specified range so as to reduce allergen levels, particularly those of house-dust mites (HDM), within an interior space of a building (including but not limited to one or more rooms, an interior space of part of a building or dwelling, and an interior space of an entire building or dwelling), while maintaining sufficient moisture to prevent drying of mucous membranes of individuals inhabiting the space. The invention also provides a hydrogel absorber/desorber for reversibly absorbing water vapor from air or releasing water vapor to air. The invention is based on the surprising discovery, on the part of the inventors, that a reversible hydrogel desiccant may be used as the active element of a humidifier/dehumidifier with much more efficiency and lower energy consumption than traditional humidification/dehumidification systems. The invention provides a complete HCS that treats the air within an interior space in a building, e.g., one or more rooms in a dwelling, by drawing fresh air from outside and adjusting the humidity of the air-stream. In certain embodiments, fresh air can be drawn from the outside and mixed with recirculated air. The HCS uses a controller, e.g., a microprocessor, to introduce fresh air into the interior space and to control circulation within it. Relative humidity (RH) is monitored remotely throughout the interior space using either wired or wireless sensors.

The invention provides a humidity control system for controlling relative humidity within an interior space of a building comprising:
(a) a water vapor absorber/desorber for reversibly absorbing water vapor from air or releasing water vapor to air;
(b) a water reservoir for collecting liquid water from the absorber/desorber operably connected to the absorber/desorber;
(c) a water source for supplying liquid water to the absorber/desorber operably connected to the absorber/desorber;
(d) a blower for blowing air through the absorber/desorber operably connected to the absorber/desorber;
(e) at least one humidity sensor for sensing relative humidity within the interior space; and
(f) a controller operably connected to:
  (i) the absorber/desorber,
  (ii) the water reservoir,
  (iii) the water source,
  (iv) the blower, and
  (v) the at least one humidity sensor, wherein the controller is adapted to identify relative humidity from data generated by the at least one humidity sensor.

In one embodiment, the humidity control system further comprises an air mixer for combining the fresh air stream and a recirculated air stream into a mixed air stream operatively connected to the blower, wherein the mixer comprises an inlet for admitting the recirculated air stream.

In another embodiment, the absorber/desorber comprises a hydrogel. In another embodiment, the hydrogel is an intelligent hydrogel. In another embodiment, the hydrogel is regenerated by temperature stimulation. In another embodiment, the hydrogel is regenerated by mechanical stimulation. In another embodiment, the hydrogel is regenerated by electrostatic stimulation. In another embodiment, the hydrogel is selected from the group consisting of copolymerized N-isopropyl acrylamide, acrylic acid, poly(2-hydroxypropyl methacrylate) and poly(allylamine hydrochloride).

In another embodiment, the humidity control system further comprises an air flow monitor.

In another embodiment, the absorber/desorber comprises a fresh air inlet.

In another embodiment, the controller is a microprocessor.

In another embodiment, the humidity control system further comprises an evaporative cooler operatively connected to the water reservoir or the water source.

In another embodiment, the humidity control system further comprises a water valve for directing water from the water reservoir to the evaporative cooler, wherein the water valve is operatively connected to the water reservoir and to the evaporative cooler.

In another embodiment, the humidity control system further comprises a water valve for directing water from the water source to the evaporative cooler, wherein the water valve is operatively connected to the water source and to the evaporative cooler.

In another embodiment, the humidity control system further comprises an air-to-air heat exchanger for returning the mixed air stream near-ambient temperature.

In another embodiment, the humidity control system further comprises a housing.

In another embodiment, the humidity control system further comprises a filter operatively connected to the absorber/desorber.

In another embodiment, the humidity control system further comprises a monitor for monitoring flow of the fresh air stream through the filter.

The invention also provides a method for maintaining a predetermined level of relative humidity in air within an interior space of a building comprising the steps of:
(a) providing a humidity control system, wherein the humidity control system comprises:
  (i) a water vapor absorber/desorber for reversibly absorbing water vapor from air or releasing water vapor to air,
  (ii) a water reservoir for collecting liquid water from the absorber/desorber operably connected to the absorber/desorber, (iii) a water source for supplying liquid water to the absorber/desorber operably connected to the absorber/desorber, (iv) a blower for blowing air through the absorber/desorber operably connected to the absorber/desorber, (v) at least one humidity sensor for sensing relative humidity within the interior space, and (vi) a controller operably connected to:
  (a) the absorber/desorber,
  (b) the water reservoir,
  (c) the water source,
  (d) the blower, and
  (e) the at least one humidity sensor, wherein the controller is adapted to identify relative humidity from data generated by the at least one humidity sensor;

(b) blowing interior space air, fresh air or a mixture of interior space air and fresh air with the blower through the humidity control system;

(c) determining an ambient level of relative humidity in the interior space with the at least one humidity sensor;

(d) determining whether the absorber/desorber is in need of regeneration and regenerating the absorber/desorber if the absorber/desorber is in need of regeneration;

(f) determining whether the water reservoir is full and draining the reservoir if the reservoir is full;

(g) either:
  (i) absorbing water vapor from the air with the absorber/desorber and periodically regenerating the absorber/desorber by removing liquid water from the absorber/desorber if the level of relative humidity is above the predetermined level, or
  (ii) adding liquid water to the absorber/desorber and releasing water vapor to the air with the absorber/desorber if the level of relative humidity is below the predetermined level, wherein the controller is adapted to identify relative humidity from data generated by the at least one humidity sensor.

The invention also provides a water vapor absorber/desorber for reversibly absorbing water vapor from air or releasing water vapor to air comprising a hydrogel.

In one embodiment, the hydrogel is an intelligent hydrogel. In another embodiment, the hydrogel is regenerated by temperature stimulation. In another embodiment, the hydrogel is regenerated by mechanical stimulation. In another embodiment, the hydrogel is regenerated by electrostatic stimulation. In another embodiment, the hydrogel is selected from the group consisting of copolymerized N-isopropyl acrylamide, acrylic acid, poly(2-hydroxypropyl methacrylate and poly)allylamine hydrochloride).

The invention also provides a method for maintaining a predetermined level of relative humidity in air within an interior space of a building comprising the steps of:

(a) providing a water vapor absorber/desorber for reversibly absorbing water vapor from air or releasing water vapor to air wherein the absorber/desorber comprises a hydrogel, and (b) either:
  (i) absorbing water vapor from the air with the absorber/desorber and periodically regenerating the absorber/desorber by removing liquid water from the absorber/desorber if the level of relative humidity is above the predetermined level, or
  (ii) adding liquid water to the absorber/desorber and releasing water vapor to the air with the absorber/desorber if the level of relative humidity is below the predetermined level.

In one embodiment, the hydrogel is an intelligent hydrogel. In another embodiment, the hydrogel is regenerated by temperature stimulation. In another embodiment, the hydrogel is regenerated by mechanical stimulation. In another embodiment, the hydrogel is regenerated by electrostatic stimulation. In another embodiment, the hydrogel is selected from the group consisting of copolymerized N-isopropyl acrylamide, acrylic acid, poly(2-hydroxypropyl methacrylate) and poly(allylamine hydrochloride).

BRIEF DESCRIPTION OF THE DRAWINGS

The present invention is described herein with reference to the accompanying drawings, in which similar reference characters denote similar elements throughout the several views. It is to be understood that in some instances, various aspects of the invention may be shown exaggerated or enlarged to facilitate an understanding of the invention.

DETAILED DESCRIPTION OF THE INVENTION

Figure 1:
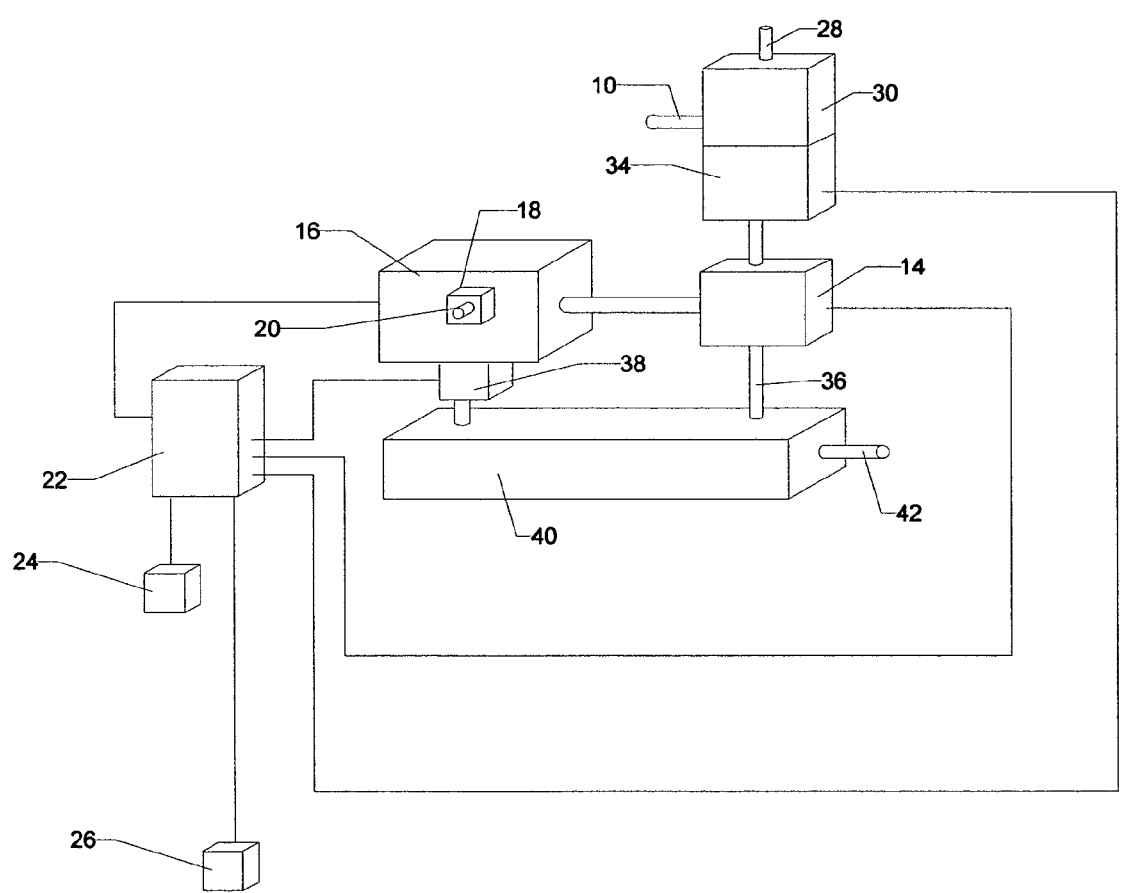
FIG. 1 shows a diagrammatic view of one embodiment of the HCS of the invention. Note that in this embodiment, the same water reservoir, 16, both collects liquid water from and supplies liquid water to the reversible water vapor absorber/desorber, 14. 10, fresh air inlet. 14, reversible water vapor absorber/desorber. 16, water reservoir. 18, valve. 20, drain. 22, controller. 24, local humidity sensor. 26, remote humidity sensor. 28, recirculated air inlet. 30, air mixer. 34, blower. 36, conditioned air line. 38, valve. 40, heat exchanger. 42, conditioned air outlet.

The present invention provides a humidity control system (HCS) (FIG. 1) to control indoor humidity within a specified range so as to reduce allergen levels, particularly those of house-dust mites (HDM), within an interior space of a building (including but not limited to one or more rooms, an interior space of part of a building or dwelling, and an interior space of an entire building or dwelling), while maintaining sufficient moisture to prevent drying of mucous membranes of individuals inhabiting the space. The invention also provides a hydrogel absorber/desorber for reversibly absorbing water vapor from air or releasing water vapor to air. The invention is based on the surprising discovery, on the part of the inventors, that a reversible hydrogel desiccant may be used as the active element of a humidifier/dehumidifier with much more efficiency and lower energy consumption than traditional humidification/dehumidification systems. The invention provides a complete HCS that treats the air within an interior space of a building, e.g., one or more rooms in a dwelling, by drawing fresh air from outside and adjusting the humidity of the air-stream (FIG. 2). In certain embodiments, fresh air can be drawn from the outside and mixed with recirculated air. The HCS uses a controller, e.g., a microprocessor, to introduce fresh air into the interior space and to control circulation with it. Relative humidity (RH) is monitored remotely throughout the interior space, using either wired or wireless sensors.

In one embodiment, the invention provides a humidity control system for controlling relative humidity within an interior space of a building comprising:
  (a) a water vapor absorber/desorber for reversibly absorbing water vapor from air or releasing water vapor to air;
  (b) a water reservoir for collecting liquid water from the absorber/desorber operably connected to the absorber/desorber;
  (c) a water source for supplying liquid water to the absorber/desorber operably connected to the absorber/desorber;
  (d) a blower for blowing air through the absorber/desorber operably connected to the absorber/desorber;
  (e) at least one humidity sensor for sensing relative humidity within the interior space; and
  (f) a controller operably connected to:
    (i) the absorber/desorber,
    (ii) the water reservoir,
    (iii) the water source,
    (iv) the blower, and
    (v) the at least one humidity sensor, wherein the controller is adapted to identify relative humidity from data generated by the at least one humidity sensor.

For clarity of disclosure, and not by way of limitation, the detailed description of the invention is divided into the subsections set forth below.

5.1. Water Vapor Absorber/Desorber (14)

The invention provides an HCS that comprises a water vapor absorber/desorber (FIG. 1, 14) for reversible absorbing water vapor from air or releasing water vapor to air. In one embodiment, the absorber/desorber comprises a hydrogel (FIG. 3, 201; FIGS. 4-9) for absorption or desorption of water.

Figure 3:
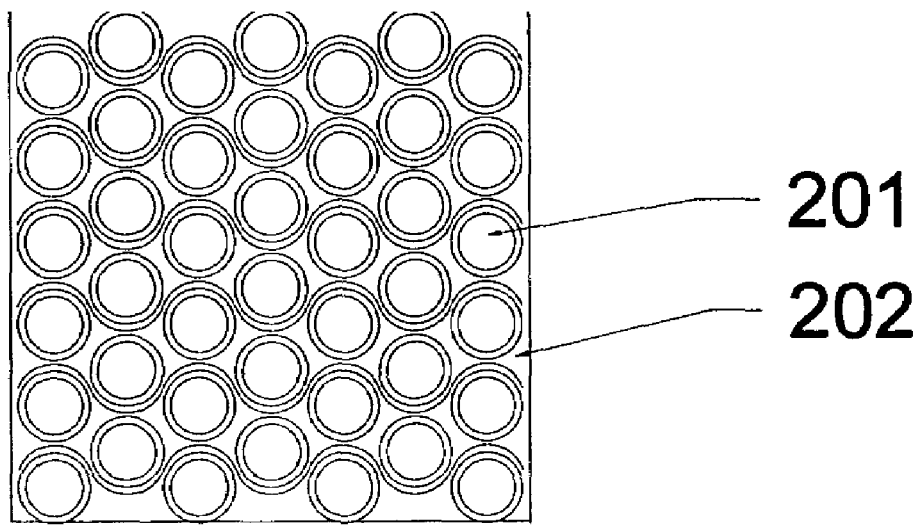
FIG. 3 is a schematic of an end (cross-sectional) view (A) and a top view (B) of a reversible absorber/desorber comprising a hydrogel. The hydrogel structure is composed of long hydrogel tubes, 201, stacked within a hydrophobic support structure or matrix, 202. The top view (B) of the reversible absorber/desorber additionally shows a screw jack as viewed from above, 203, which can be used to mechanically squeeze the hydrogel tubes, causing them to release water. The arrow in view (B) indicates the direction of air flow.
Figure 3:
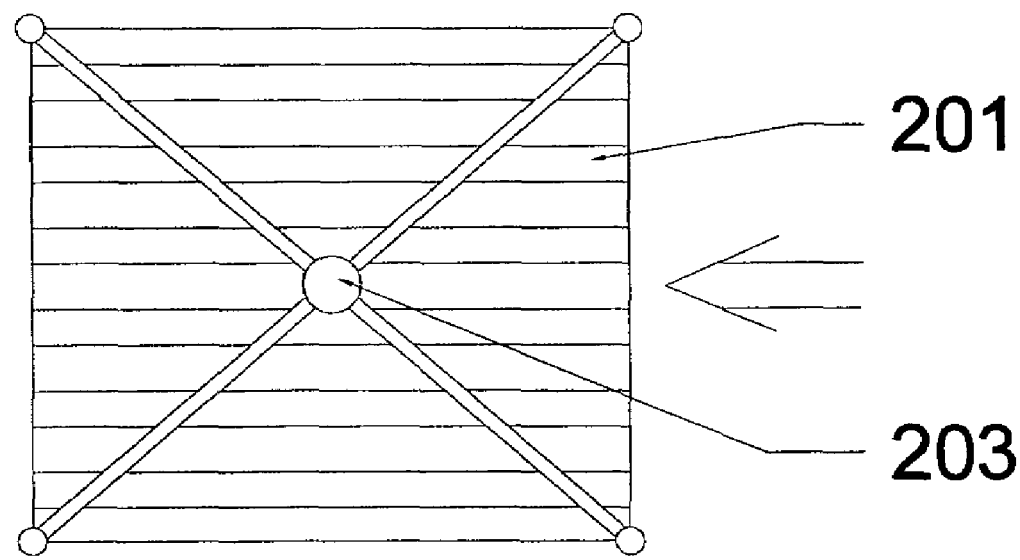

The invention also provides a water vapor absorber/desorber for reversibly absorbing water vapor from air or releasing water vapor to air comprising a hydrogel. In one embodiment, the absorber/desorber comprises long hydrogel tubes stacked within a hydrophobic support structure or matrix (FIG. 3).

Hydrogels are preferred over silica gel desiccants for removal of moisture from an air stream, since silica gel can absorb only about 40% by weight of moisture and consumes a substantial amount of energy to release this water. Hydrogels, by contrast, have the ability to absorb enormous amounts of water (several thousand percent by weight) via swelling without structural disintegration.

In one embodiment, the hydrogel is an "intelligent" hydrogel, which absorbs or releases water, in either its liquid or vapor form, in the presence of an external stimulus such as a change in temperature, applied pressure or an electrical potential. Thus, in certain embodiments of the invention, an intelligent hydrogel that is responsive to, and regenerated by, changes in temperature, mechanical or electrostatic stimulation is used as the active element in the absorber/desorber.

Depending on its sensitiveness, the hydrogel is regenerated by thermal, mechanical, electrical or electrostatic regeneration. To reduce energy consumption in certain embodiments, the hydrogel is regenerated by electrostatic or mechanical means. In one embodiment, the hydrogel is regenerated by blowing hot air across it using, e.g., a hot air jet or gun. In another embodiment, the hydrogel is regenerated by electrical resistance heating.

Many temperature-sensitive hydrogels known in the art are suitable for use in the HCS of the invention, including but not limited to copolymerized N-isopropyl acrylamide (NIPAAm), acrylic acid (AAc), poly(2-hydroxypropyl methacrylate) and poly(allylamine hydrochloride).

Polyampholytic hydrogels are well known in the art (English, Mafé, Manzanares, Yu, Grosberg and Tanaka, Equilibrium Swelling Properties of Polyampholytic Hydrogels, J. Chem. Phys., 104, 21 (1996) 8713-8720; Tien, Barish, Gu and Ottova, Supported Bilayer Lipid Membranes as Ion and Molecular Probes, Analytical Sciences 14, (1998) 3-18).

Figure 4:
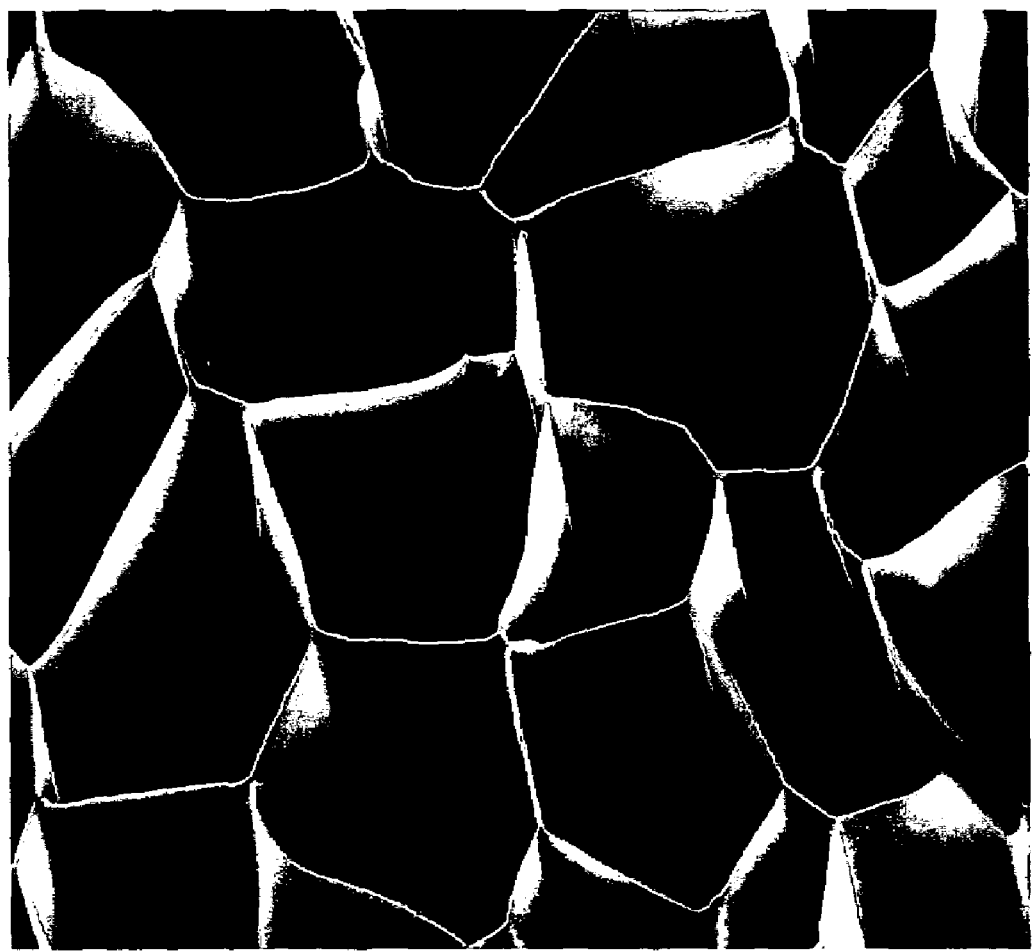
FIG. 4 shows a scanning electron micrograph (SEM) image of a hydrogel structure. The large pores provide sufficient surface for rapid uptake of moisture. Pore size is roughly 10 μm.
Figure 5:
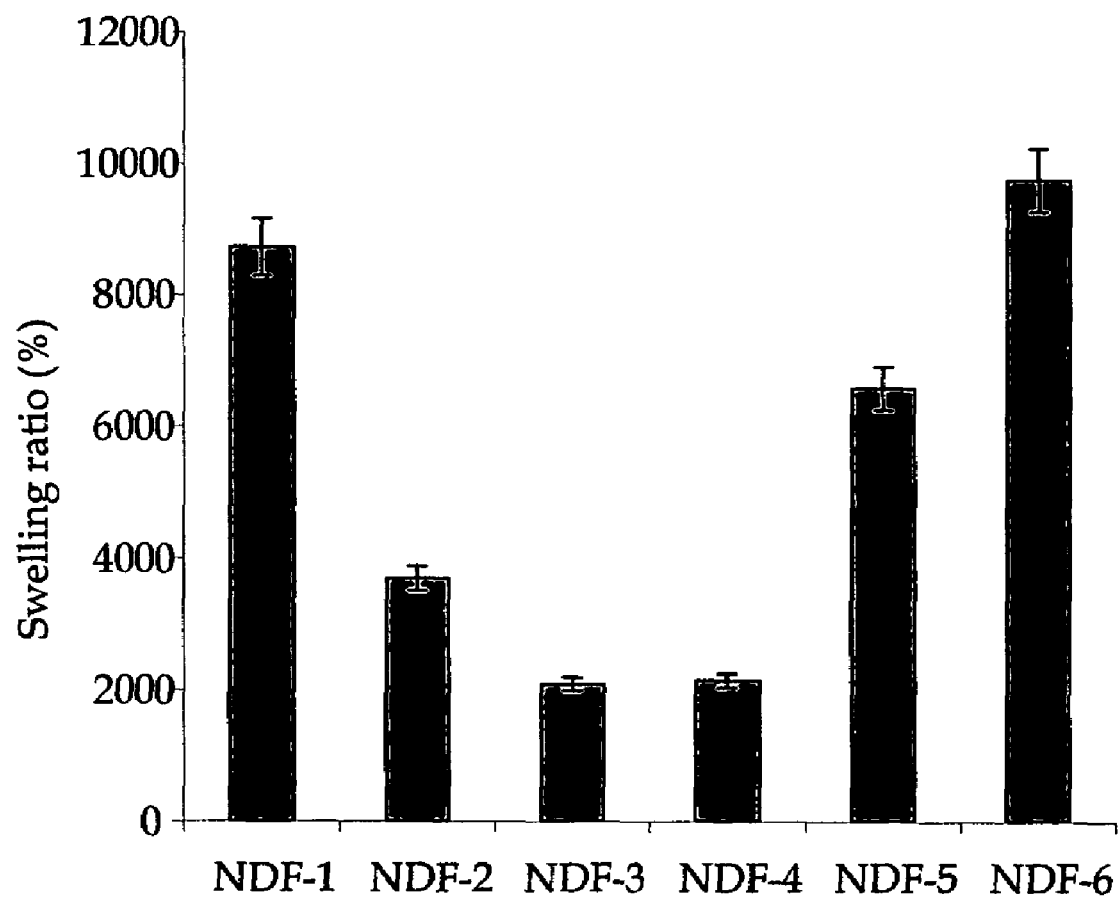
FIG. 5 shows equilibrium swelling ratios of poly(N-isopropylacryl-amide) hydrogel family in water at room temperature.
Figure 6:
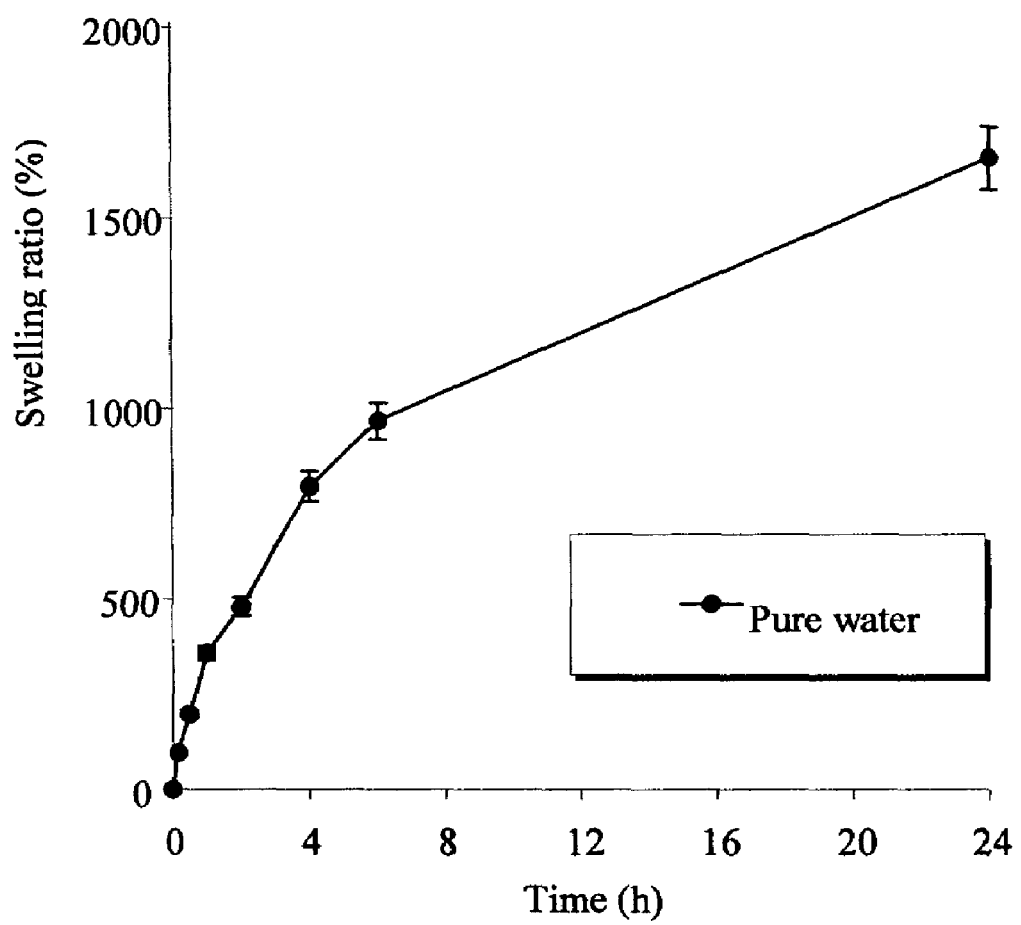
FIG. 6 shows swelling kinetics of a poly(N-isopropylacrylamide)-based hydrogel in water at room temperature.
Figure 7:
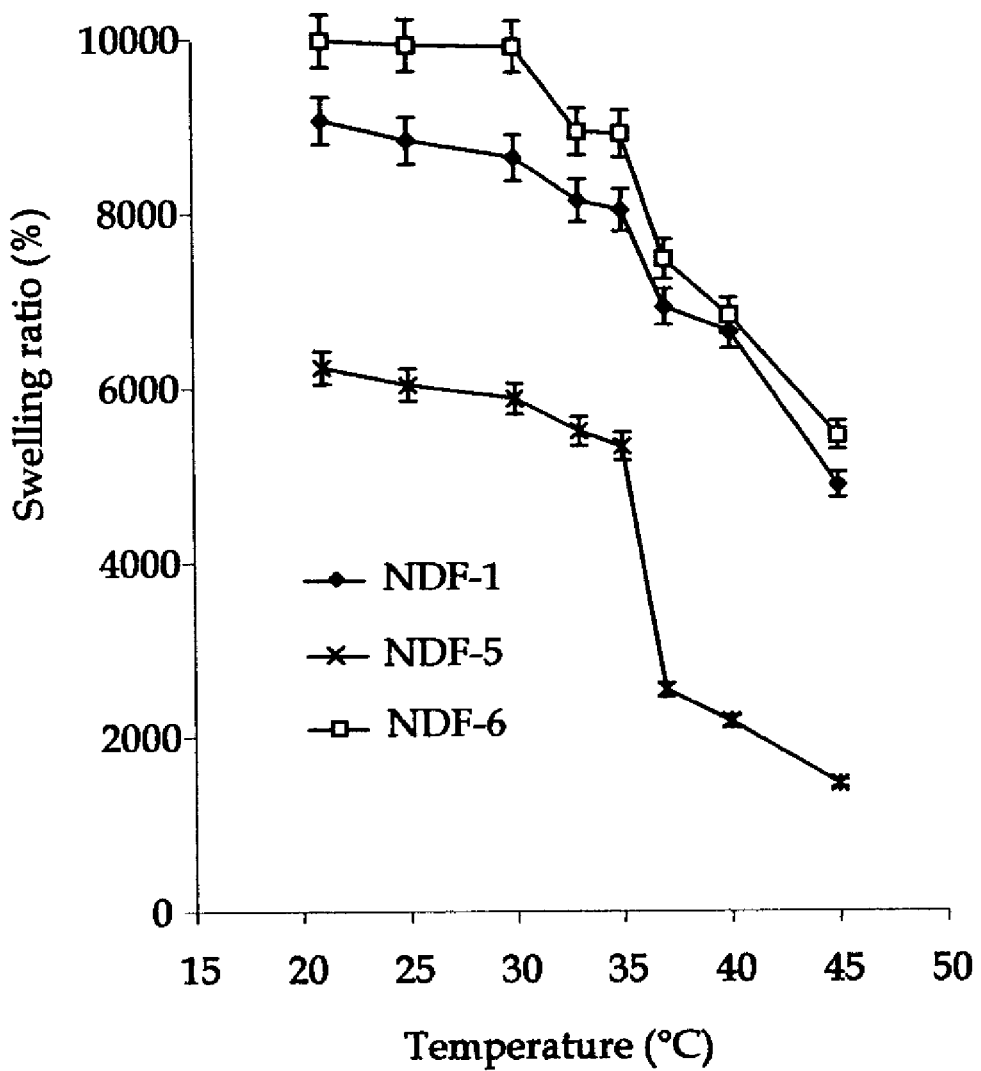
FIG. 7 shows the effect of temperature on the swelling of poly(N-isopropylacrylamide)-based hydrogels in water.

The three-dimensional, porous, network structure of a temperature-sensitive hydrogel developed by C. C. Chu and colleagues is shown in FIG. 4. This family of poly(N-isopropylacrylamide) hydrogels has an extremely regular pore shape and size. The swelling of this particular type of hydrogel can be controlled by external stimuli such as temperature. FIG. 5 shows the swelling ratios of the poly(N-isopropylacrylamide) hydrogel family. The swelling ratio (defined as the weight of water that can be absorbed as a percentage of the dry hydrogel weight) ranges from $2 \times 10^3\%$ to as high as $10^4\%$. An example of the swelling kinetics of this family of hydrogels is shown in FIG. 6. Over the course of 24 hours, this hydrogel keeps absorbing liquid to as high as a $1.7 \times 10^3\%$ swelling ratio.

Small changes in temperature can induce additional water absorption or cause liquid water to be released. This can be seen in FIG. 7 where, over a temperature range of 20° to 45° C., the swelling ratio of three poly(N-isopropylacrylamide) hydrogels changes by a factor of two to three.

There is a narrow temperature range through which the swelling ratio changes abruptly: this temperature range is called the lower critical solution temperature (LCST). The value of LCST can be controlled by the chemical composition of the hydrogel precursors. Those hydrogels that respond to changes in temperature can be tailored, according to methods well known in the art to respond at a particular temperature, typically 37° C. (see, e.g., Kim et al., "Synthesis and Characterization of Dextran-maleic acid Based Hydrogel," J. Biomed. Mater. Res., 46(2): 160-170, (1999); Kim et al., "Synthesis and characterization of dextran-based hydrogel prepared by photocrosslinking," Carbohydrate Polymers, 40: 183-190, (1999); Zhang et al., "Synthesis and characterization of novel biodegradable IPN hydrogels having both hydrophobic and hydrophilic components with controlled swelling properties", J. Polym. Sci., Polymer Chemistry, 37: 4554-4569, (1999); Kim et al., "Synthesis and characterization of dextran-methacrylate hydrogel and its structure study by SEM", J. Biomed. Mater. Res., 49(4): 517-527, (2000); Zhang et al., "Synthesis and characterization of biodegradable hydrogels having Polylactide and dextran components with controlled swelling properties", J. Polym. Sci., Polymer Chemistry, 38: 2392-2404, (2000); De et al., "Equilibrium swelling and kinetics of pH-responsive hydrogels: models, experiments and simulations", J. Microelectromechanical Systems, 11, 5 (Oct. 2002), 544-555). In a preferred embodiment, the LCST is a temperature above ambient room temperature and the hydrogel regenerates at the LCST by releasing water. At 37° C., for example, most of the moisture can be ejected from the hydrogel without allowing much of the heat to escape to the room. In one embodiment, the LCST of the hydrogel falls in the range of 32-38° C. (or 90-100° F.). In another embodiment, the LCST of the hydrogel falls in the range of 38-50° C. (or 100-120° F.).

Figure 8:
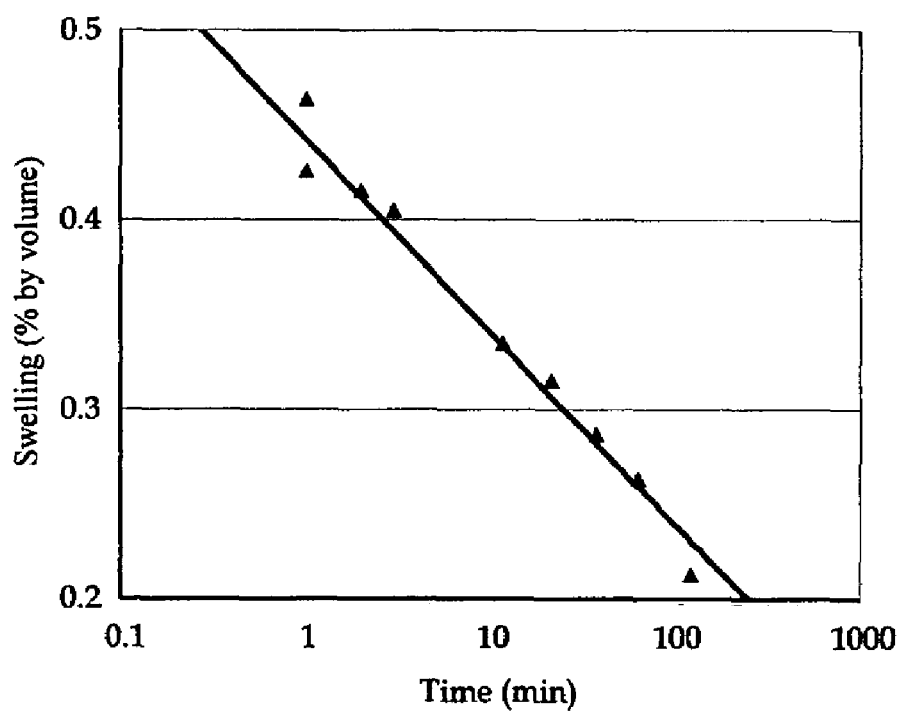
FIG. 8 shows shrinkage of a hydrogel after removal of a 25 V field. A current of 50 mA was drawn.
Figure 9:
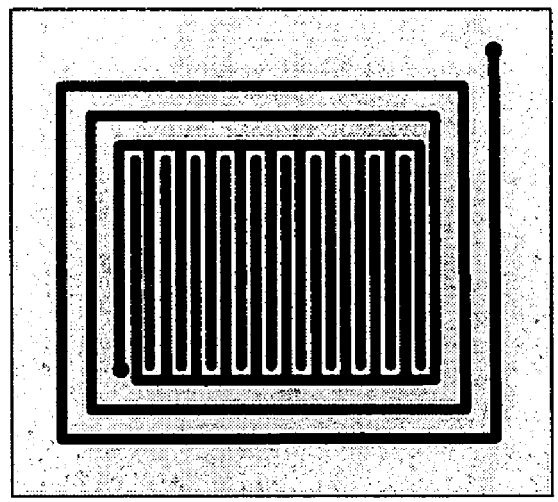
FIG. 9 shows the wiring pattern of an interdigitated capacitor and loop antenna.

In certain embodiments, a hydrogel material can be used that responds to an applied charge by absorbing or releasing water. FIG. 8 shows the properties of such a hydrogel material. A hydrogel sheet was placed between two stainless steel, mesh electrodes and immersed in water. After the hydrogel had stabilized, 25 VDC was applied to the electrodes. After 30 minutes, the volume had increased by an additional 46%. Removal of the electric field resulted in relaxation and shrinkage of the hydrogel and expulsion of water, as shown in FIG. 8.

In another embodiment, the absorber/desorber, e.g., hydrogel, is compressed mechanically with a mechanical compressor to cause it to displace liquid water. For example, with reference to FIGS. 3 and 4, the stack of hydrogel tubes can be compressed with a screw-jack (FIG. 3) and water will flow out the ends of the tubes. The stack can be tilted to enhance water flow.

A hydrogel's pore structure can be optimized for fastest absorption or release. As water is absorbed the pores of the hydrogel swell shut and it becomes increasingly more difficult to pass air through them. Larger pores reduce the hydrogel's surface area, decreasing the amount of water that can be absorbed or released but allowing a greater air-flow. The design of the hydrogel element can be optimized using methods well known in the art.

Clogging of the hydrogel by small particles and the growth of molds or fungi can be prevented using art-known methods. In one embodiment, a filter, e.g., a HEPA or N-100 filter, is incorporated into the HCS and operatively connected to, e.g., upstream of, the absorber/desorber. In this configuration, the filter can be used to prevent clogging of the hydrogel with small particles, molds or fungi.

In one embodiment, the HCS comprises a monitor for monitoring flow of the fresh air stream through the filter. For example, flow resistance of the filter can be monitored so that the user can be altered if the filter becomes clogged. Monitoring devices for monitoring flow resistance through filters (e.g., through furnace filters) are commonly known in the art. For example, in one embodiment, a pinwheel is placed downstream from the filter, and flow rate can be measured from the rate of wheel turning. In another embodiment, a sail vane switch is used to indicate serious loss of air flow. The speed of a D.C. fan can also be used to control the flow-rate.

In another embodiment, growth of molds or fungi is controlled by installing a UV source proximate to the hydrogel and periodically irradiating the hydrogel. In another embodiment, growth of molds or fungi is controlled by impregnating the hydrogel with one or more antifungal drugs. Antifungal drugs suitable for impregnation in the hydrogel include, but are not limited to, Amphotericin B, Butoconazole, Carbol-Fuchsin, Ciclopirox, Clotrimzole, Dapsone, Econazole, Emlkonazole, Fluconazole, Flucytosine, Gentian Violet, Griseofulvin, Haloprogin, hydroxystilbamidine isethionate, iodides, Itraconazole, Ketoconazole, Mafenide, Miconazole, Naftifine, Nystatin, Oxiconazole, Silver Sulfadiazine, Sulconazole, Terbinafine, Terconazole, Thiabendazole, Tioconazole, Tolnaftate and undecylenic acid.

In one embodiment, the hydrogel is in the form of a sheet, with a supporting structure, attached to a high-pressure air plenum. Air forced through 10 µm pores, for example, encounters a surface area approaching $4 \times 10^5$ m$^2$ for a 1 m$^2$, 10 mm-thick sheet. The thickness that can be used, however, is a function of the pressure drop across the sheet, which increases as moisture is absorbed and the hydrogel swells. To determine whether a given type of hydrogel may be used according to the invention, the degree of swelling and flow-resistance of the hydrogel sheets is determined.

In another embodiment, a hydrogel sheet is formed by laying a layer of hydrogel on top of the porous metal sheet, e.g., a wire mesh or perforated metal sheet. The metal sheet not only provides structural support, but also serves as a means to increase the temperature of the hydrogel, triggering release of liquid water. For example, in one embodiment, a hydrogel/wire-mesh sandwich structure is used to form the hydrogel sheet, and the wire-mesh is used as structural support to increase the temperature of the hydrogel and trigger the release of liquid water. Electrical resistance heating of the wire-mesh can be used for this purpose. A hydrophobic, non-conductive coating can also be used, in certain embodiments, so that expelled water will not adhere to the surface of the mesh preventing liquid collection.

Unlike currently available desiccant driers, a moving wheel is not required if a hydrogel/wide-mesh sandwich structure, such as the one described above, is used. Brief, periodic cycles of water exclusion have little effect on a room's humidity, since air-flow can be interrupted during these cycles. In certain embodiments, humidification, if desired, can be accomplished by the continuous flow of water from the top of the sheet driven by a low-volume, low-power peristaltic pump. This water can be injected on the high-pressure side of the sheet so that the flow of air can drive it through the hydrophobic mesh.

In another embodiment, an alternative structure based on the hydrogel sheet is used. In this embodiment, a hydrogel-impregnated fabric is supported under tension between two movable rollers. Water may be removed by mechanical compression of the sheet between squeeze rollers at the bottom. The dried portion of sheet is then pulled into the air-stream for continued operation. Such a system can operate either cyclically or continuously. Humidification is accomplished by removing pressure at the pair of rollers and applying water directly to the sheet prior to moving it into the air-stream.

In another embodiment, a design such as that shown in FIG. 3, is used. In this embodiment, long, slender tubes with hydrogel-impregnated fabric are supported in a matrix of hydrophobic trays. Water may be removed by compression or by heating as described above. This arrangement prevents the large changes in flow resistance through the humidifier/dehumidifier element that can occur as pores swell. In this embodiment, saturation of the hydrogel is detected by monitoring up- and down-stream RH with sensors in the air-flow. Humidification may be accomplished by applying water to the hydrogel using a spray.

Figure 2:
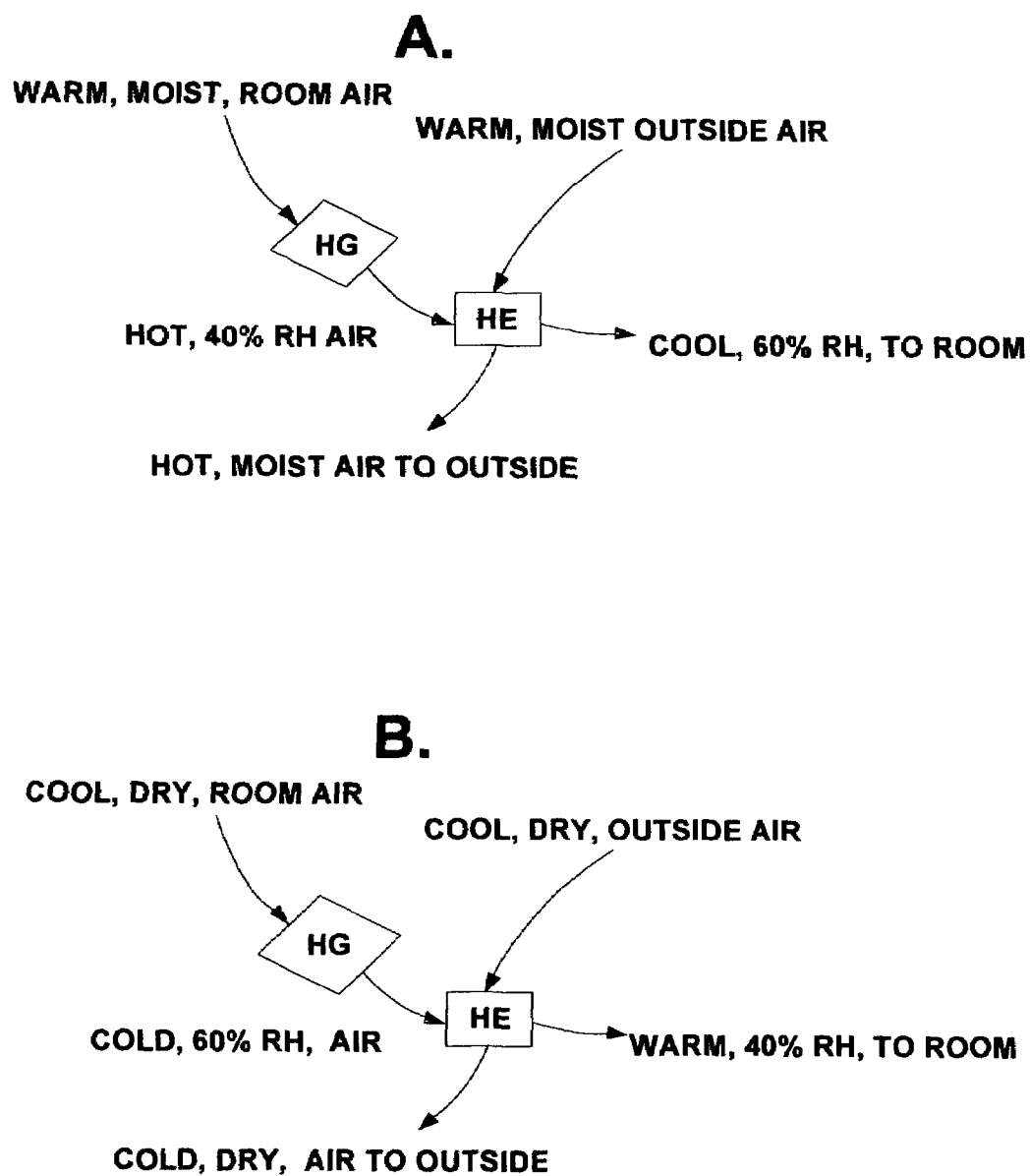
FIG. 2 shows control format flow diagrams for dry (A) and moisturizing (B) control using the HCS of the invention to dehumidify a room. In (A), the hydrogel (HG) function to dry the warm, moist room air flowing through it. In (B), the hydrogel functions to moisturize the cool, dry room air flowing through it. HE, air-to-air heat exchanger.

In another embodiment, the absorber/desorber comprises an air inlet for admitting a fresh air stream (FIG. 1, 10). Any air inlet commonly known in the art can be used as the fresh air inlet.

5.2. Water Reservoir (16); Water Source

The HCS of the invention comprises a water reservoir (FIG. 1, 16) for collecting and/or storing liquid water removed from the absorber/desorber operably connected to the absorber/desorber, and a water source for supplying liquid water to the absorber/desorber operably connected to the absorber/desorber. In one embodiment, a water reservoir serves as both the water reservoir and the water source, i.e., to both collect liquid water from and to supply liquid water to the absorber/desorber. In another embodiment, one or more reservoirs is used to collect water from, and one or more reservoirs is used to supply water to, the absorber/desorber. In another embodiment, a plumbed water supply is used as the water source. In a specific embodiment, the water reservoir or water source comprises a water storage tank.

In another embodiment, the water reservoir or the water source comprises a conduit for channeling liquid water to and/or from the absorber/desorber.

In one embodiment, water removed during regeneration of a hydrogel absorber/desorber is collected in a water reservoir that is operatively connected to the absorber/desorber. In one embodiment, the water reservoir is used to supply water and/or store water that has been removed from the fresh air stream by the absorber/desorber.

Liquid water may be removed from the hydrogel using principles well known in the art. Thermal, mechanical or electrical regeneration may be used for this purpose. In one embodiment, the absorber/desorber employs a hydrogel that is dried using thermal regeneration. Heated air used for this purpose can be exhausted outside the interior space of the building. In another embodiment, a trough or drain can be used to channel water away from a hydrogel that is regenerated using mechanical regeneration or electrostatic regeneration.

In one embodiment, the water reservoir is provided with an outlet that is used to regulate the water level in the reservoir. In another embodiment, a liquid level sensor is used to sense the level of water in the reservoir, to regulate inflow into the tank, and to prevent water from being added to a full reservoir.

In another embodiment, the controller is operatively connected to at least one humidity sensor and regulates the water level in the water reservoir.

The HCS of the invention comprises a water source that is operatively connected to, and supplies liquid water to, the absorber/desorber.

In another embodiment, the water reservoir or water source is operatively connected to, and used to supply water to, an evaporative cooler. In one aspect of this embodiment, a water valve is used to regulate the outflow of water from the water reservoir (or water source) to the evaporative cooler.

5.3. Blower (34)

The HCS of the invention comprises at least one blower (FIG. 1, 34) for blowing interior space air, fresh air, or a mixture of interior space air (or recirculated air) and fresh air, through the absorber/desorber operably connected to the absorber/desorber. The design and construction of blowers is well known in the art, and a blower suitable for use in the invention can be obtained commercially (e.g., Ametek Rotron (Kent, Ohio), American Aldes Ventilation Corporation (Sarasota Fla.), Sunbelt Heating and Air Conditioning (Shawnee, Okla.), The Energy Outlet (Eugene Oreg.).

In one embodiment, at least one blower is used to force air through the absorber/desorber and also to blow the conditioned air steam into the heat exchanger, e.g., into an air-to-air heat exchanger or evaporative cooler.

In another embodiment, at least one blower is operatively connected to the air mixer. In a specific embodiment, the blower blows the mixed, conditioned air stream into the heat exchanger, e.g., into an air-to-air heat exchanger or evaporative cooler.

Performance of the HCS can be maximized by using blowers designed specifically to deliver low volumes at high pressure. Other considerations for blower selection are acoustic noise, reliability and power consumption.

Figure 10:
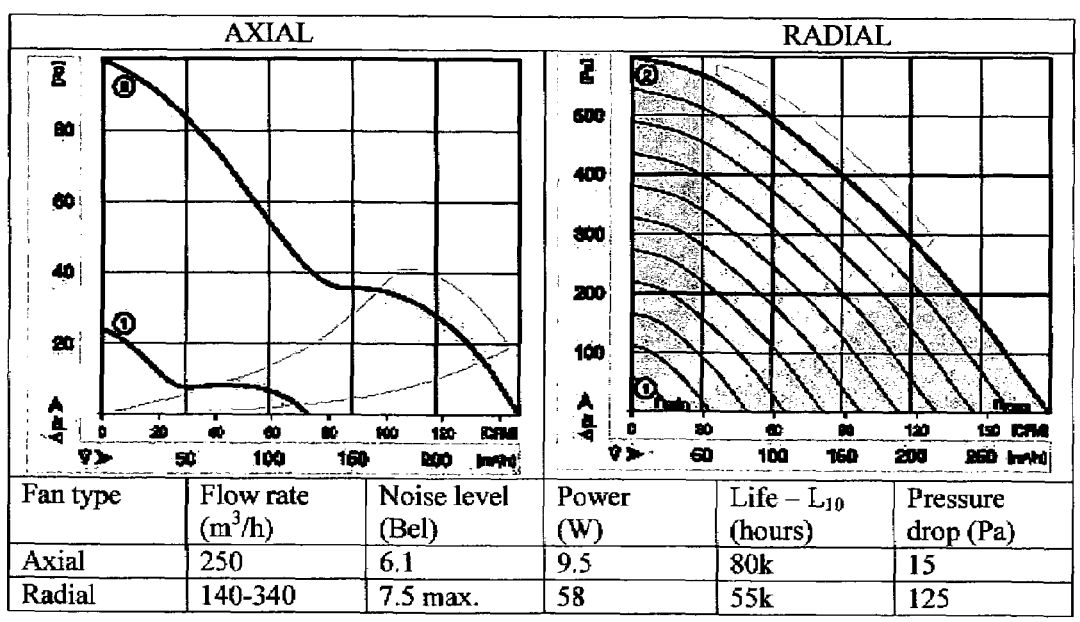
FIG. 10 shows performance of a typical axial-flow blower (left chart and line 2 of table) and radial-flow blower (right chart and line 3 of table).

In one embodiment, the blower is a radial-flow fan. Radial-flow fans offer excellent performance in these conditions as shown in FIG. 10. Although the noise level produced by a radial flow fan is relatively high, it is generally radiated at frequencies above 2 kHz where it is easily absorbed.

In one embodiment, the absorber/desorber is configured to act as an efficient muffler. For example, the inlet side of the fan can be located outside of the interior space of the building in which the HCS operates, thus noise from the fan must propagate through the hydrogel sheet, which absorbs acoustic energy, before it is radiated into the interior space.

The ASHRAE has established guidelines for ventilation within buildings, the specifications for which can be incorporated into HCS of the invention. The volume of air circulated within a room is specified in air-changes per hour (ACH,) which is defined as the ratio of the volume flow rate to the room volume. In one embodiment, a range of 6-12 ACH is achieved. Much of air can simply be recirculated, although preferably at least 1.3 ACH of fresh air is introduced. Assuming that a typical bedroom has a volume of 20 $m^3$, and taking the upper limit of the ASHRAE recommendations, a blower for use in this application delivers up to 240 $m^3$/hr.

As air flows through the hydrogel absorber/desorber, there will be a significant pressure drop. The pressure drop is governed by the open area through which air can flow, the size of the openings in the absorber/desorber, the distance that the air must travel through the absorber/desorber, and the velocity of the air. If the hydrogel absorber/desorber is in the form of a sheet with flow through the pores the pressure drop is very high, especially as the sheet absorbs moisture and the pores swell shut, and the volume flow drops dramatically. As a result a larger pore size, which reduces the surface area, may be more effective in absorbing and desorbing water because the volume flow rate remains higher. In another embodiment tubes of hydrogel material present a large open area and a lower pressure drop but absorb/desorb efficiently due to the greater volume flow. In yet a further embodiment air flows across closely spaced sheets of hydrogel.

5.4. Local (24) and Remote (26) Humidity Sensors; Temperature Sensors

The HCS of the invention comprises one or more humidity sensors for sensing relative humidity (RH). The controller is operatively connected to the humidity sensor(s) (FIG. 1, 22). In one embodiment, the sensor is a local sensor (FIG. 1, 24) that is housed near or within the HCS housing or attached outside of the housing. In another embodiment, the sensor is a remote sensor (FIG. 1, 26). In another embodiment, the HCS has at least one local and one remote sensor. RH sensors are commercially available, e.g., SHT-15 sensors (Sensirion AG, Zurich, Switzerland) which have +/−2% accuracy.

As discussed above in Section 2, existing room dehumidifiers and air-conditioners have the drawback that they rely on a sensor located directly on the appliance, near the air-stream, where conditions may not represent those of the entire room. The HCS of the invention overcomes this drawback, since in certain embodiments, one or more remote sensors are used to get a true measure of the humidity within the living space.

Typical battery-powered devices are relatively large and their placement is limited by wiring and aesthetic consideration. System operation can also be degraded if the batteries are not replaced regularly. To overcome this drawback, in one embodiment of the invention, a small, wireless passive humidity sensor is used as a remote sensor. In one aspect of this embodiment, the humidity sensor is an RFID device that requires no batteries, is energized by radio frequency (RF) radiation and wirelessly returns its identification code, along with data indicating the instantaneous humidity (and, in certain embodiments, another measurand such as temperature) via RF radiation. This makes it possible to install a wireless passive humidity sensor virtually anywhere within an interior space of a building.

In another embodiment, the HCS of the invention comprises a temperature sensor operatively connected to the controller.

Wireless passive humidity sensors, as well as temperature sensors, that are suitable for use in the HCS of the invention may be constructed using the methods disclosed in co-pending U.S. patent application Ser. No. 10/732,717 entitled "Sensor for monitoring environmental parameters in concrete," by Johnson and Kulesza, and No. 10,878,690 entitled "Parallel-plate capacitive element for monitoring environmental parameters in concrete" by Johnson, each of which is incorporated by reference herein in its entirety.

In another embodiment, a passive RH sensor is used, allowing wireless communication with the microprocessor. The RH of the air passing through the HCS and being returned to the interior space is monitored to provide additional feedback and to monitor system performance.

In another other embodiment, the humidity sensor is a UHF-based sensor. In another embodiment, the humidity sensor transmits data using two-way wireless radio transmissions. The humidity sensor transmits data using a one-way direct wired connection. In another embodiment, the humidity sensor transmits data using a two-way direct wired connection. In another embodiment, the humidity sensor transmits data using one-way infrared transmission. In another embodiment, the humidity sensor transmits data using two-way infrared transmission. In another embodiment, the humidity sensor transmits data using one-way ultrasonic transmission. In another embodiment, the humidity sensor transmits data using one-way ultrasonic transmission. In another embodiment, the humidity sensor transmits data using one-way high frequency impressed on the AC power line and transmitted via house wiring. In another embodiment, the humidity sensor transmits data using two-way high frequency impressed on the AC power line and transmitted via house wiring.

5.5. Controller (22)

Figure 12:
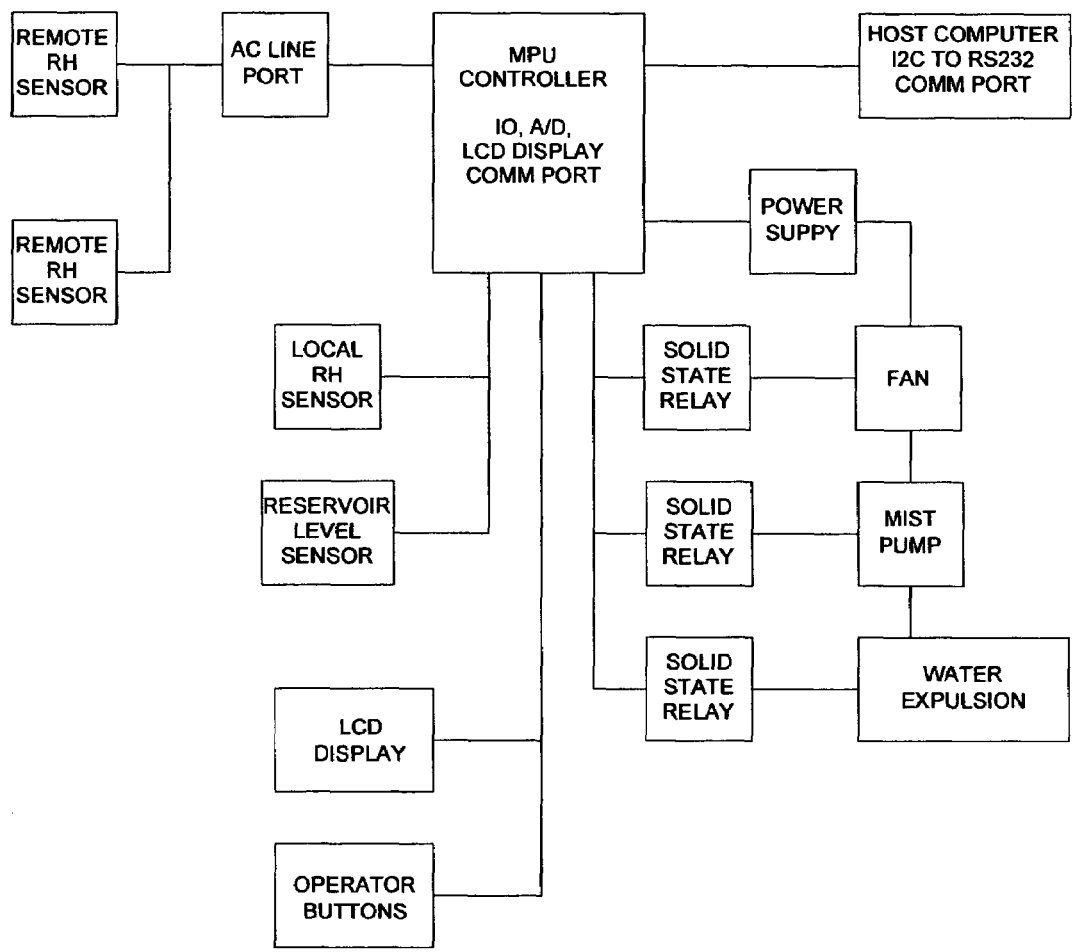
FIG. 12 shows operable connections to the controller for one embodiment of the HCS.

The operation of the HCS of the invention is controlled by a controller. The HCS comprises at least one controller (FIG. 1, 22) that is operably connected to:
(i) the absorber/desorber,
(ii) the water reservoir,
(iii) the water source,
(iv) the blower, and
(v) the at least one humidity sensor, wherein the controller is adapted to identify relative humidity from data generated by the at least one humidity sensor. FIG. 12 shows operable connections to the controller for one embodiment of the HCS.

In a specific embodiment, the controller is a microprocessor (e.g. a MicroChip™ processor, Microchip Technology Inc., Chandler, Ariz). This microprocessor has multiple A/D inputs for sensing temperature and humidity, remote enable lines for powering devices and an data bus for communication with peripheral units.

According to the invention, the controller controls the operation of the absorber/desorber (FIG. 1, 14), the water reservoir(s) (FIG. 1, 16) that store water for the system, the water source, the blower (FIG. 1, 34), and the humidity sensor(s) (FIG. 1, 24, 36). In certain embodiments, the controller can control a regeneration system for regenerating the absorber/desorber. In another embodiment, the controller controls the position of a water valve on the reservoir (FIG. 1, 18) and the efflux of water in the reservoir to an outlet or drain.

The controller also regulates the addition of liquid water to the absorber/desorber when humidification is required. In a specific embodiment, the controller controls the position of a water valve on the water reservoir or water source to provide water to an evaporative cooler.

In another embodiment, the controller controls the operation of the at least one blower (FIG. 1, 34).

In another embodiment, the controller is operatively connected to the filter and signals the user that the filter must be replaced.

In another embodiment, the microprocessor is equipped with an LCD display and programmed to reveal set-points, sensor values, historical readings, and corrective actions along with date and time. The HCS can upload this data through a data interface to a personal computer for data storage and analysis.

In another embodiment, the user sets the command reference value for RH. The microprocessor controls the RH of the interior space using feedback from the remote and local sensors, as well as the set-point for the command reference value and by directing and controlling the flow of air through the hydrogel desiccant pile. Other sensors can monitor the ability of the hydrogel to absorb or release water and the microprocessor executes regenerative cycles. The design of one embodiment of the invention is illustrated in FIG. 1.

5.6. Air Mixer (30)

In one embodiment, the HCS of the invention comprises an air mixer (FIG. 1, 30) for combining the fresh air stream and a recirculated air stream into a mixed, conditioned air stream operatively connected to the blower wherein the mixer comprises a recirculated air inlet (FIG. 1, 28) for admitting the recirculated air stream and a second inlet (FIG. 1, 10) for admitting fresh air.

The design and construction of air mixers is well known in the art, and a mixer suitable for use in the invention can be obtained commercially, e.g., Wedge Products Inc. (Twinsburg, Ohio), Kees, Inc. (Elkhart Lake, Wis.), American Aldes Ventilation Corporation (Sarasota, Fla.), Sunbelt Heating and Air Conditioning (Shawnee, Okla.), The Energy Outlet (Eugene, Oreg.).

5.7. Heat Exchanger (40)

In one embodiment, the HCS of the invention comprises a heat exchanger (FIG. 1, 40) for returning the conditioned air stream to near-ambient temperature. Heat exchangers are well known in the art and obtainable commercially.

In one embodiment, the heat exchanger is an air-to-air heat exchanger. The design and construction of air-to-air heat exchangers is well known in the art, and an air-to-air heat exchanger suitable for use in the invention can be obtained commercially, e.g., American Aldes Ventilation Corporation (Sarasota Fla.), Sunbelt Heating and Air Conditioning (Shawnee, Okla.), The Energy Outlet (Eugene Oreg.).

In another embodiment, the heat exchanger is an evaporative cooler as described hereinbelow. In another embodiment, the heat exchanger comprises an air-to-air heat exchanger and an evaporative cooler that are operatively connected together.

In certain embodiments, the heat exchanger comprises a conditioned air outlet through which the conditioned air is released into the interior space of the building.

5.8. Evaporative Cooler

In one embodiment, the heat exchanger comprises an evaporative cooler operatively connected to the water reservoir or the water source. Heat from a conditioned air stream entering the evaporative cooler, i.e., an air stream composed of both fresh and recirculated air, is transferred, as water on the surface of the evaporative cooler evaporates. A water valve (FIG. 1, 38) that is operatively connected to the water reservoir and to the evaporative cooler and controlled by the controller can be used to direct water from the water reservoir to the evaporative cooler. Air cooled by the evaporative cooler is then injected into the interior space at the conditioned air outlet (FIG. 1, 42).

Any evaporative cooler commonly known in the art can be used. Standard evaporative coolers are obtainable commercially, e.g., from Gilmore-Kramer Co. (Providence, R.I.), Port-A-Cool Distribution (Franklin, Tenn.), AdobeAir, Inc. (Phoenix, Ariz.). In such standard evaporative coolers, water on a radiator-type material is evaporated with a fan, thus removing heat from the air.

5.9. Housing

In certain embodiments, the HCS of the invention comprises a housing. In one embodiment, the housing is constructed of vibration-damping sheet metal to reduce panel resonances, e.g., to below 50 dBA. In certain embodiments, the housing encloses the absorber/desorber, the regeneration system, the water reservoir, a local humidity sensor, at least one blower, and the system controller. In other embodiments, it can additionally enclose valves, supply lines, an evaporative cooler, an air mixer or a heat-exchanger. In other embodiments, a local humidity sensor is fastened to the outside of the housing.

5.10. Humidity Control System Design

The invention provides a complete HCS that treats the air within the interior space of a building, e.g., one or more rooms, by drawing fresh air from outside and adjusting the humidity of the air-stream. In certain embodiments, fresh air can be drawn from the outside and mixed with recirculated air. In one embodiment, the HCS of the invention is a unit that is free-standing or window-mounted. It can use either a plumbed water supply and waste drain or connected to the water reservoir, that can be filled and emptied by the user. In certain embodiments, the unit signals the user when it needs to be filled or emptied. When operating only as a dehumidifier, waste water can be eliminated by a low-power, peristaltic pump through a window, by a fixed drain, by emptying of the tank or by reuse for evaporative cooling.

In one embodiment, the device is wall-mounted and water tanks are outside the chambers to provide easy access and service.

5.11. Air Flow Monitors

In one embodiment, the HCS comprises an air flow monitor for monitoring blower speed or flow of the fresh air stream through the filter. Monitoring devices for monitoring flow resistance through filters (e.g., through furnace filters) are commonly known in the art. The resistance to flow can be monitored by monitoring the blower speed so that clogging of the filter (e.g., a HEPA or N-100 filter), or reduction of open area in the hydrogel, can be detected.

In one embodiment, in which a radial fan is used as the blower, as the resistance to flow increases, the fan's rotational speed increases proportionally. When the speed reaches a programmable level, the microprocessor initiates water removal from the hydrogel.

In another embodiment, a pinwheel serves as an air flow monitor and is placed downstream from the filter. Flow rate is measured from the rate of wheel turning. In another embodiment, a sail vane switch is used to indicate loss of air flow.

5.12. Method for Maintaining Predetermined Level of Relative Humidity

The invention provides a method for maintaining a predetermined level of relative humidity in air within an interior space of a building comprising the steps of:
(a) providing a humidity control system, wherein the humidity control system comprises:
   (i) a water vapor absorber/desorber for reversibly absorbing water vapor from air or releasing water vapor to air, (ii) a water reservoir for collecting liquid water from the absorber/desorber operably connected to the absorber/desorber,
(iii) a water source for supplying liquid water to the absorber/desorber operably connected to the absorber/desorber,
(iv) a blower for blowing air through the absorber/desorber operably connected to the absorber/desorber,
(v) at least one humidity sensor for sensing relative humidity within the interior space, and
(vi) a controller operably connected to;
 (a) the absorber/desorber,
 (b) the water reservoir,
 (c) the water source,
 (d) the blower, and
 (e) the at least one humidity sensor, wherein the controller is adapted to identify relative humidity from data generated by the at least one humidity sensor;
(b) blowing interior space air, fresh air or a mixture of interior space air and fresh air with the blower through the humidity control system;
(c) determining an ambient level of relative humidity in the interior space with the at least one humidity sensor;
(d) determining whether the absorber/desorber is in need of regeneration and regenerating the absorber/desorber if the absorber/desorber is in need of regeneration;
(f) determining whether the water reservoir is full and draining the reservoir if the reservoir is full;
(g) either:
 (i) absorbing water vapor from the air with the absorber/desorber and periodically regenerating the absorber/desorber by removing liquid water from the absorber/desorber if the level of relative humidity is above the predetermined level, or
 (ii) adding liquid water to the absorber/desorber and releasing water vapor to the air with the absorber/desorber if the level of relative humidity is below the predetermined level, wherein the controller is adapted to identify relative humidity from data generated by the at least one humidity sensor.

The invention also provides a method for maintaining a predetermined level of relative humidity in air within an interior space of a building comprising the steps of:
(a) providing a water vapor absorber/desorber for reversibly absorbing water vapor from air or releasing water vapor to air wherein the absorber/desorber comprises a hydrogel, and
(b) either:
 (i) absorbing water vapor from the air with the absorber/desorber and periodically regenerating the absorber/desorber by removing liquid water from the absorber/desorber if the level of relative humidity is above the predetermined level, or
 (ii) adding liquid water to the absorber/desorber and releasing water vapor to the air with the absorber/desorber if the level of relative humidity is below the predetermined level.

Figure 11:
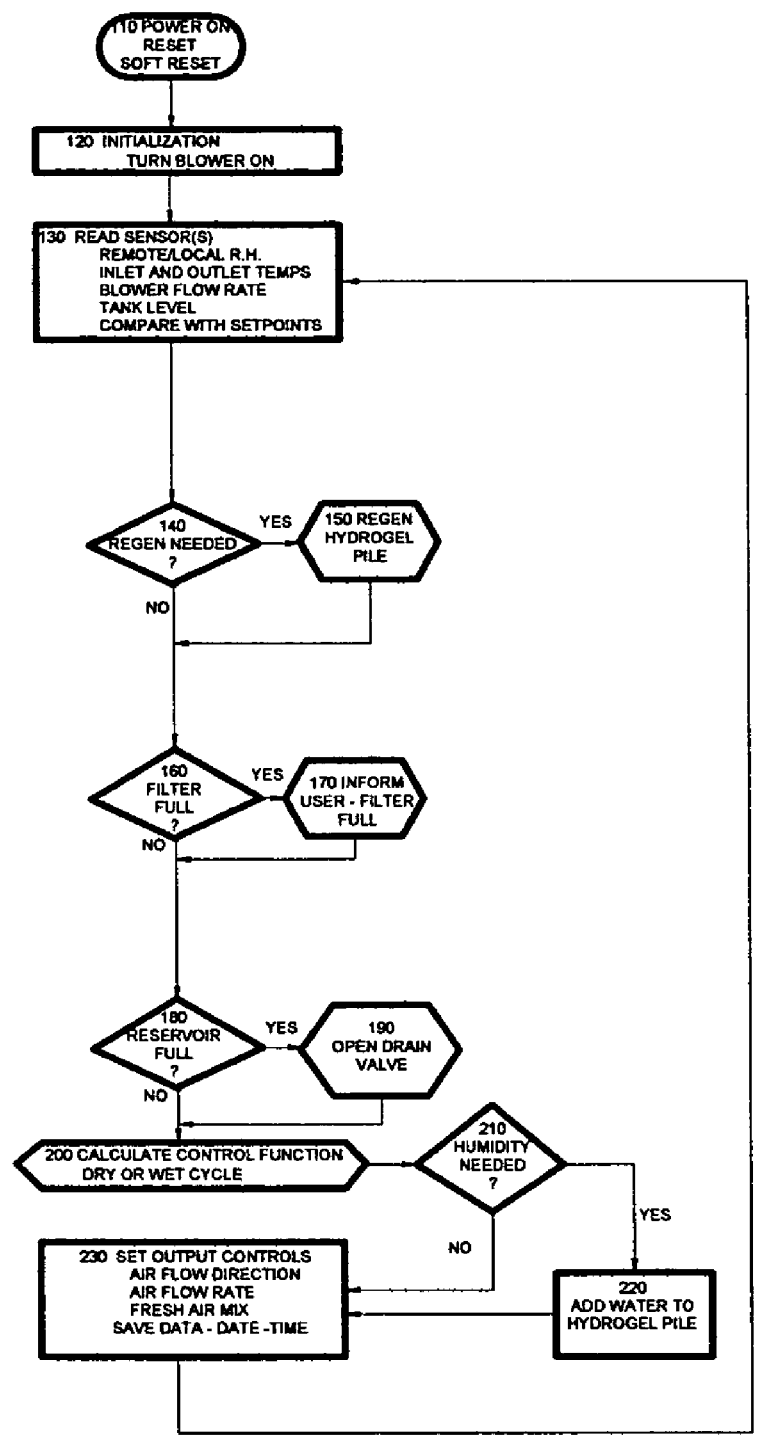
FIG. 11 shows a system control flow chart for one embodiment of the HCS. In this embodiment, the reversible water vapor absorber/desorber is a hydrogel.

The operation of a particular embodiment of the system is described with reference to FIG. 11. When power is first applied to the system (110) the controller initializes a sequence of events beginning with turning on the blower (120). Data from the sensors are read, including local and remote R.H., inlet and outlet temperatures, the rotational speed of the blower and the water level in the reservoir. These data are compared with setpoints.

If the blower's rotational speed exceeds a setpoint (130) indicating that the volume flow rate is too low, the hydrogel absorber/desorber is regenerated (150). Regeneration is accomplished by any of the several means described above, e.g., heating with embedded electrical resistance wires; squeezing between roller or with a jack screw arrangement; or application of an electric field. Air flow through the system may be shut off during regeneration by turning off the blower if heating is used for regeneration.

After testing and regeneration have been completed the blower speed is again read (160). If speed has increased beyond another setpoint a warning light or status on a panel-mounted display is set, indicting to the user that the HEPA filter is clogged and must be changed (170). This blower speed can be retained in memory so that the rate of clogging can be monitored and a change date predicted. Steps 160 and 170 are undertaken immediately after regeneration so that flow resistance through the reversible hydrogel absorber/desorber can be eliminated from the calculation.

After flow has been measured the water reservoir's level sensor is read. If the level is too high or too low (180) a warning light or status on the panel-mounted display is set, indicating to the user that the tank must be emptied or filled (190). If a waste drain and plumbed water supply are used the controller can open a valve to maintain the desired water level.

Data from the R.H. and temperature sensors is then used to determine whether humidification or dehumidification is required (200). For humidification liquid water may is sprayed or pumped onto the hydrogel element; alternatively, at least a portion of the hydrogel may be immersed in the water reservoir and subsequently moved into the air-stream (220). For dehumidification no further action is required.

The desired ratio of fresh air to recirculated air is then calculated and vanes within the mixer are set accordingly (230). Alternatively, the speed of a blower on the recirculated air inlet can be controlled to achieve the desired ratio. Data is then saved in memory and the controller loops back to (130). Since operating parameters are slowly varying a delay may be added to the control logic if desired.

5.13. Testing of the HCS for Allergen Control

Testing of the HCS can be carried out according to methods well known in the art, e.g., in test and control chambers using fabric contaminated with dust mites. Sample house dust mite (HDM) allergens can be collected in both the test and control chambers. ELISA can be used to determine the effectiveness of humidity control on concentrations of well-known HDM allergens such Der p1 and Der F1.

In a specific testing protocol, dust is collected from beds within volunteers' homes. Loose fibers and hair are removed using a sieve prior to mixing and introduction to the control and test chambers, each of which are approximately 8 m$^2$. The floor of each chamber is covered using nylon carpeting, marked out in a 200 cm grid pattern, for dust retention. Nylon can be used because it retains the least amount of dust during vacuuming.

Dust is introduced using compressed air, delivered through a nozzle, and allowed to settle uniformly over the carpeted surfaces. The target concentration level is 500 mg/m$^2$. Dust is then sampled daily from paired 400 cm$^2$ areas using a handheld vacuum cleaner containing a HEPA filter in a filter chamber. Sample areas are randomized. Identical HCS's are used within each chamber. Humidity is monitored in the control chamber but moisture is neither introduced nor removed. The two chambers draw intake air through HEPA filters from a common plenum ensuring that temperature and intake RH are identical. The air exchange rate is maintained identically in both chambers and fixed to 1.3 ACH. Exhaust from each chamber is through a HEPA filter at ceiling level to prevent allergen-bearing dust to escape to the laboratory.

Temperature is monitored in both chambers and a resistive heater with a circulating fan is used in the control chamber to simulate the heating caused by work done by the active HCS within the test chamber. In the test chamber moisture is controlled to 50% RH within the tolerance limits of the HCS, which provides excellent conditions for HDM reproduction.

After collecting dust samples, the weight is measured to ±0.01 mg using a laboratory balance. Sample size is expected to be about 20 mg for each test. Both Der p1 and Der f1 are extracted and quantified by Enzyme-Linked Immunosorbent Assay (ELISA). An ELISA kit, such as that supplied by Indoor Biotechnologies, Inc. (Charlottesville, Va.), can be used. The test protocol is described in detail in Chapman et al.("Monoclonal immunoassays for major dust mite (Dermatophagoides) allergens, Der p 1 and Der f 1, and quantitative analysis of the allergen content of mite and house dust extracts", *J. Allergy & Clin. Immunol.* 80 (1987) 184-194)).

A data logger independently records the indoor and outdoor RH and temperature, volume flow rate from the HCS, date and time of samples and door access, and saves this data in a spreadsheet for later analysis of system performance.

The present invention is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety and for all purposes to the same extent as if each individual publication, patent or patent application was specifically and individually indicated to be incorporated by reference in its entirety for all purposes.

The citation of any publication is for its disclosure prior to the filing data and should not be construed as an admission that the present invention is not entitled to antedate such publication by virtue of prior invention.

What is claimed is:

1. A humidity control system for controlling relative humidity within an interior space of a building comprising:
    (a) a water vapor absorber/desorber for reversibly absorbing water vapor from air or releasing water vapor to air;
    (b) a water reservoir for collecting liquid water from the absorber/desorber operably connected to the absorber/desorber;
    (c) a water source for supplying liquid water to the absorber/desorber operably connected to the absorber/desorber;
    (d) a blower for blowing air through the absorber/desorber operably connected to the absorber/desorber;
    (e) at least one humidity sensor for sensing relative humidity within the interior space; and
    (f) a controller operably connected to:
        (i) the absorber/desorber,
        (ii) the water reservoir,
        (iii) the water source,
        (iv) the blower, and
        (v) the at least one humidity sensor, wherein the controller is adapted to identify relative humidity from data generated by the at least one humidity sensor.

2. The humidity control system of claim 1 further comprising an air mixer for combining the fresh air stream and a recirculated air stream into a mixed air stream operatively connected to the blower, wherein the mixer comprises an inlet for admitting the recirculated air stream.

3. The humidity control system of claim 1, wherein the absorber/desorber comprises a hydrogel.

4. The humidity control system of claim 3 wherein the hydrogel is an intelligent hydrogel.

5. The humidity control system of claim 3 wherein the hydrogel is regenerated by temperature stimulation.

6. The humidity control system of claim 3 wherein the hydrogel is regenerated by mechanical stimulation.

7. The humidity control system of claim 3 wherein the hydrogel is regenerated by electrostatic stimulation.

8. The humidity control system of claim 3 wherein the LCST of the hydrogel falls in the range of 32-38° C.

9. The humidity control system of claim 3 wherein the LCST of the hydrogel falls in the range of 38-50° C.

10. The humidity control system of claim 1 further comprising an air flow monitor.

11. The humidity control system of claim 1 wherein the absorber/desorber comprises a fresh air inlet.

12. The humidity control system of claim 1 wherein the controller is a microprocessor.

13. The humidity control system of claim 1 further comprising an evaporative cooler operatively connected to the water reservoir or the water source.

14. The humidity control system of claim 13 further comprising a water valve for directing water from the water reservoir to the evaporative cooler, wherein the water valve is operatively connected to the water reservoir and to the evaporative cooler.

15. The humidity control system of claim 13 further comprising a water valve for directing water from the water source to the evaporative cooler, wherein the water valve is operatively connected to the water source and to the evaporative cooler.

16. The humidity control system of claim 1 further comprising an air-to-air heat exchanger for returning the mixed air stream to near-ambient temperature.

17. The humidity control system of claim 1 further comprising a housing.

18. The humidity control system of claim 1 further comprising a filter operatively connected to the absorber/desorber.

19. The humidity control system of claim 18 further comprising a monitor for monitoring flow of the fresh air stream through the filter.

20. A method for maintaining a predetermined level of relative humidity in air within an interior space of a building comprising the steps of:
    (a) providing a humidity control system, wherein the humidity control system comprises:
        (i) a water vapor absorber/desorber for reversibly absorbing water vapor from air or releasing water vapor to air,
        (ii) a water reservoir for collecting liquid water from the absorber/desorber operably connected to the absorber/desorber,
        (iii) a water source for supplying liquid water to the absorber/desorber operably connected to the absorber/desorber, (iv) a blower for blowing air through the absorber/desorber operably connected to the absorber/desorber, (v) at least one humidity sensor for sensing relative humidity within the interior space, and (vi) a controller operably connected to
   (a) the absorber/desorber,
   (b) the water reservoir,
   (c) the water source,
   (d) the blower, and
   (e) the at least one humidity sensor, wherein the controller is adapted to identify relative humidity from data generated by the at least one humidity sensor, (b) blowing interior space air, fresh air or a mixture of interior space air and fresh air with the blower through the humidity control system;

(c) determining an ambient level of relative humidity in the interior space with the at least one humidity sensor;

(d) determining whether the absorber/desorber is in need of regeneration and regenerating the absorber/desorber if the absorber/desorber is in need of regeneration;

(f) determining whether the water reservoir is full and draining the reservoir if the reservoir is full;

(g) either:
   (i) absorbing water vapor from the air with the absorber/desorber and periodically regenerating the absorber/desorber by removing liquid water from the absorber/desorber if the level of relative humidity is above the predetermined level, or
   (ii) adding liquid water to the absorber/desorber and releasing water vapor to the air with the absorber/desorber if the level of relative humidity is below the predetermined level, wherein the controller is adapted to identify relative humidity from data generated by the at least one humidity sensor.

* * * * *